United States Patent
Balachandran et al.

(10) Patent No.: US 9,369,944 B2
(45) Date of Patent: Jun. 14, 2016

(54) METHODS OF MODIFYING COMMUNICATION NETWORK ACCESS AND RELATED NETWORK NODES, AND WIRELESS TERMINALS

(75) Inventors: Kumar Balachandran, Pleasanton, CA (US); Konstantinos Dimou, Stockholm (SE); Joachim Sachs, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1215 days.

(21) Appl. No.: 13/327,931

(22) Filed: Dec. 16, 2011

(65) Prior Publication Data
US 2013/0035064 A1  Feb. 7, 2013

Related U.S. Application Data

(60) Provisional application No. 61/515,559, filed on Aug. 5, 2011.

(51) Int. Cl.
 *H04L 12/28* (2006.01)
 *H04W 48/02* (2009.01)
 *H04L 12/56* (2006.01)

(52) U.S. Cl.
 CPC .................................... *H04W 48/02* (2013.01)

(58) Field of Classification Search
 CPC ........................................................ H04W 48/02
 USPC ............................................ 370/375.2, 395.2
 See application file for complete search history.

(56) References Cited

U.S. PATENT DOCUMENTS

2013/0122906 A1* 5/2013 Klatt ........................ 455/435.1

FOREIGN PATENT DOCUMENTS

EP  2 205 026 A1  7/2010

OTHER PUBLICATIONS

International Search Report Corresponding to International Application No. PCT/IB2012/053942; Date of Mailing: Nov. 2, 2012; 15 Pages.
CATT: "Access control for MTC", R2-105388, 3GPP TSG RAN WG2 Meeting #71bis Xi'an, China, Oct. 11-15, 2010, 4 Pages.
Ericsson, ST-Ericsson, "Extended access barring for MTC devices", R2-113030, 3GPP RSG-RAN WG2 #74, Barcelona, Spain, May 9-13, 2011, 3 Pages.

(Continued)

*Primary Examiner* — Huy C Ho
(74) *Attorney, Agent, or Firm* — Myers Bigel & Sibley, P.A.

(57) ABSTRACT

A method may be provided in a wireless terminal to modify access to a Radio Access Network. The method may include providing a barring rate at the wireless terminal and providing a barring rate modifier at the wireless terminal. A modified barring rate may be provided at the wireless terminal responsive to the barring rate and the barring rate modifier with the modified barring rate and the barring rate being different. A random number may be provided at the wireless terminal responsive to attempting to access the Radio Access Network, and access of the wireless terminal to the Radio Access Network may be blocked responsive to the random number failing to satisfy a threshold of the modified barring rate. Related wireless terminals, network nodes, and network operations are also discussed.

20 Claims, 7 Drawing Sheets

(56) References Cited

OTHER PUBLICATIONS

ETSI TS 122 011 v10.3.0 (Apr. 2011), Technical Specification, Digital cellular telecommunications system (Phase 2+); Universal Mobile Telecommunications system (UMTS); LTE; Service accessibility (3GPP TS 22.011 version 10.3.0 Release 10), Apr. 2011, 26 Pages.
International Preliminary Report on Patentability Corresponding to International Application No. PCT/IB2012/053942; Date of Issuance: Feb. 11, 2014; 9 Pages.
3GPP TS 22.011 v11.0.0 (Jun. 2011), $3^{rd}$ Generation Partnership Project; Technical Specification Group Services and System Aspects; Service accessibility (Release 11).
3GPP TS 36.300 v10.4.0 (Jun. 2011), $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Stage 2 (Release 10).
3GPP TS 36.331 v10.2.0 (Jun. 2011), $3^{rd}$ Generation Partnership Project; Technical Specification Group Radio Access Network; Evolved Universal Terrestrial Radio Access (E-UTRA); Radio Resource Control (RRC); Protocol specification (Release 10).

\* cited by examiner

METHODS OF MODIFYING COMMUNICATION NETWORK ACCESS AND RELATED NETWORK NODES, AND WIRELESS TERMINALS

RELATED APPLICATION

The present application claims the benefit of priority of U.S. Provisional Application No. 61/515,559 filed Aug. 5, 2011, the disclosure of which is hereby incorporated herein in its entirety by reference.

TECHNICAL FIELD

The present disclosure is directed to communications and, more particularly, to access control for communication networks and related methods, nodes, and wireless terminals.

BACKGROUND

In a typical cellular radio system, wireless terminals (also referred to as user equipment unit nodes or UEs, and/or mobile terminals/stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with wireless terminals within range of the base stations.

The 3GPP (3$^{rd}$ Generation Partnership Project) 22.011 standard describes access control (AC) for wireless/mobile terminals in a network. Under certain circumstances, it may be useful/necessary to prevent a wireless/mobile terminal (UE) in a wireless communications network from accessing the network. In an E-UTRAN (Evolved-UTRAN or Evolved Universal Terrestrial Radio Access Network) network, for example, access control may be useful/necessary to vary the probability of wireless/mobile terminals accessing the network for purposes of: (a) congestion control, (b) emergency situations, and/or (c) other special situations.

All wireless/mobile terminals (UEs) may be members of one of ten randomly allocated wireless/mobile terminal populations, defined as access classes 0 to 9. The access class number of a wireless/mobile terminal (UE) may be stored in memory (e.g., in a SIM or subscriber identity module, in a USIM or Universal subscriber identity module, etc.) of the wireless/mobile terminal (UE). In addition, some wireless/mobile terminals (UEs) may be members of one or more of five special categories (access classes 11 to 15), also saved in memory (e.g., in a SIM, USIM, etc.). Wireless/mobile terminals (UEs) that are members of these special categories may be given higher access priority and may be categorized as follows:

| Class | Description |
|---|---|
| 15 | PLMN (Public Land Mobile Network) Staff; |
| 14 | Emergency Services; |
| 13 | Public Utilities (e.g., water/gas suppliers); |
| 12 | Security Services; and |
| 11 | Reserved for PLMN use. |

Access class 10 may be provided for emergency calls. Requirements for E-UTRAN enhanced access control are discussed as follows.

In an E-UTRAN network, the serving network broadcasts mean durations of access control (e.g., time durations) and barring rates (e.g., percentage/decimal values) that are commonly applied to wireless/mobile terminals (UEs) of access classes 0-9. A barring rate defines the probability that a wireless/mobile terminal (UE) will be granted access to the network if the wireless/mobile terminal attempts to access the network, and a mean duration of access control defines a period of time after a barred access attempt before the wireless/mobile terminal will be allowed a next attempt to access to the network. A combination of this mechanism(s) and a mechanism(s) of UMTS (Universal Mobile Telecommunications System) may be applied for access classes 11-15.

An E-UTRAN network may support access control based on a type of access attempt (i.e., a wireless/mobile terminal originating data or a wireless/mobile terminal originating signaling), in which indications to the wireless/mobile terminals (UEs) are broadcast to guide behavior of the wireless/mobile terminal (UE). An E-UTRAN network forms combinations of access control based on a type of access attempt (e.g., wireless/mobile terminal originating, wireless/mobile terminal terminating, location registration, etc.). The mean duration of access control and the barring rate may be broadcast for each type of access attempt (i.e., wireless/mobile terminal originating data or wireless/mobile terminal originating signaling).

The wireless/mobile terminal (UE) determines its barring status with the information provided from the serving network, and the wireless/mobile terminal (UE) performs the access attempts according to the determined barring status. More particularly, the wireless/mobile terminal (UE) may draw/generate a uniform random number between 0 and 1 when initiating a network access attempt, and the wireless/mobile terminal (UE) compares this random number with the current barring rate to determine whether the network access attempt is barred or not. When the random number is lower than the current barring rate and the type of access attempt is indicated allowed, then the network access attempt is allowed. Otherwise (i.e., when the random number is greater than the current barring rate), the network access attempt is not allowed (i.e., the network access attempt is barred). If the network access attempt is not allowed (i.e., the network access attempt is barred), further network access attempts of the same access type of the same wireless/mobile terminal (UE) are barred for a period of time that is calculated based on the mean duration of access control provided by the network and the random number drawn by the UE.

The 3GPP standard further describes service specific access control (SSAC) for multimedia telephony (MMTel) functions to apply independent access control for telephony services for mobile originating session requests from idle-mode as follows. EPS (Evolved Packet System) provides a capability to assign a service probability factor and mean duration of access control for each of MMTel voice and MMTel video. The 3GPP standard also defines access control for circuit switched fall back (CSFB).

Extended access barring (EAB) is a mechanism for an operator(s) to control Mobile Originating access attempts from wireless/mobile terminals (UEs) that are configured for EAB to reduce/prevent overload of the access network and/or the core network. In congestion situations, for example, an operator of the network can restrict access from wireless/mobile terminals (UEs) configured for EAB while permitting access from other wireless/mobile terminals (UEs).

Future wireless/mobile networks may differentiate between different classes of services used by a same wireless/mobile terminal (UE) and between different classes wireless/mobile terminals (UEs). Accordingly, there may be interest to extend the concept of overload control to allow for such differentiation. A network operator, for example, may want to serve machine type communication (MTC) devices using access control that is different than access control used for other device types. Existing EAB mechanisms, however, may not adequately serve MTC devices for one or more of the following reasons.

MTC devices are not a uniform category of devices. MTC devices, for example may be used in diverse situations providing differing service characteristics for different applications, such as a smart grid applications, automotive communication applications, sensor network applications, etc. MTC devices may also benefit from characterization for access classes such as Emergency Services, Security functions, PLMN staff, etc.

Networks serving MTC devices may benefit from congestion control and overload protection that is separate from the normal EAB mechanism. A network operator, for example, may not want energy meters to load the network during rush hour. A network operator may want mobile originated access from low priority sensors to be very infrequent. Current EAB mechanisms may use a single access control barring factor/rate and a single access control barring time for all classes of terminals, MTC devices, etc.

Accordingly, there continues to exist a need in the art for improved access barring control for terminals/devices communicating with a mobile wireless communications network.

SUMMARY

It is therefore an object to address at least some of the above mentioned disadvantages and/or to improve performance of access control in a communication system.

According to some embodiments of the present invention, a method may be provided in a wireless terminal to modify access to a Radio Access Network. The method may include providing a barring rate at the wireless terminal and providing a barring rate modifier at the wireless terminal. A modified barring rate may be provided at the wireless terminal responsive to the barring rate and the barring rate modifier with the modified barring rate and the barring rate being different. A random number may be provided at the wireless terminal responsive to attempting to access the Radio Access Network, and access of the wireless terminal to the Radio Access Network may be blocked responsive to the random number failing to satisfy a threshold of the modified barring rate.

By providing a barring rate modifier, access control of a wireless terminal may be modified relative to a global barring rate provided to a plurality of wireless terminals. For example, a same global barring rate may be provided to a plurality of wireless terminals, but different barring rate modifiers may be provided for different subsets of the plurality of wireless terminals. Accordingly, different probabilities of access may be provided for the different subsets of the wireless terminals.

According to some other embodiments of the present invention, a wireless terminal may be configured to communicate with a Radio Access Network. The wireless terminal may include a processor configured to provide a barring rate and a barring rate modifier, and to provide a modified barring rate responsive to the barring rate and the barring rate modifier with the modified barring rate and the barring rate being different. The processor may be further configured to provide a random number responsive to attempting to access the Radio Access Network, and to block access to the Radio Access Network responsive to the random number failing to satisfy a threshold of the modified barring rate.

According to yet other embodiments of the present invention, a method may be provided in a node of a Radio Access Network to modify wireless terminal access. The method may include providing a barring rate for a plurality of wireless terminals with the plurality of wireless terminals including first and second mutually exclusive subsets of wireless terminals. A barring rate modifier may be provided for the first subset of wireless terminals, and the barring rate for the plurality of wireless terminals and the barring rate modifier for the first subset of wireless terminals may be transmitted from the node.

According to still other embodiments of the present invention, a node of a Radio Access Network may include a processor configured to provide a barring rate for a plurality of wireless terminals with the plurality of wireless terminals including first and second mutually exclusive subsets of wireless terminals. The processor may be further configured to provide a barring rate modifier for the first subset of wireless terminals, and to initiate transmitting the barring rate for the plurality of wireless terminals and the barring rate modifier for the first subset of wireless terminals.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
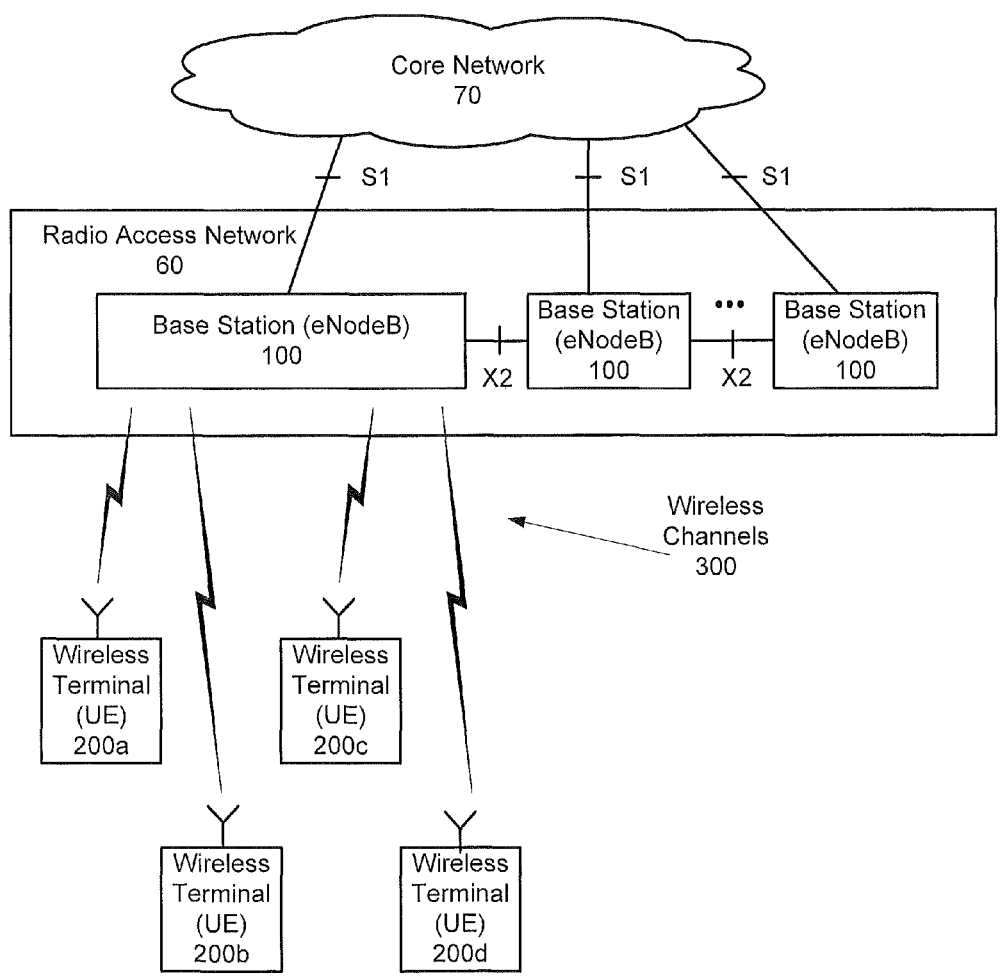
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a Radio Access Network (RAN) that communicates over radio communication channels with wireless terminals (also referred to as UEs). It will be understood, however, that the present invention is not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 1 is a block diagram of a communication system that is configured to operate according to some embodiments of the present invention. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface(s) and with the core network(s) 70 through S1 interfaces, as is well known to one who is skilled in the art.

Figure 2:
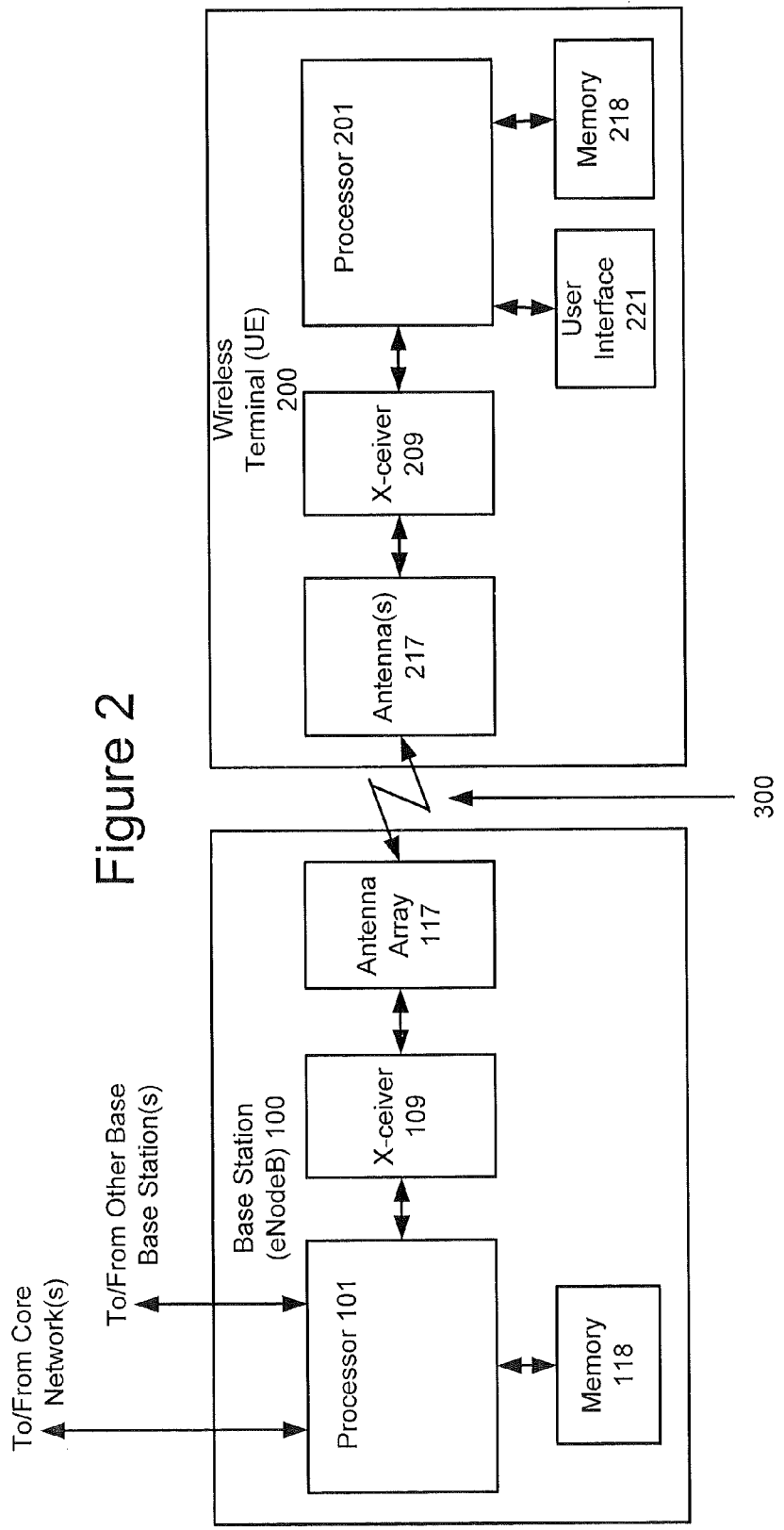
FIG. 2 is a block diagram of a base station and a wireless terminal (UE) in communication over a wireless channel according to some embodiments of FIG. 1.

FIG. 2 is a block diagram of a base station 100 and a wireless terminal 200 of FIG. 1 in communication over a wireless channel 300 according to some embodiments of the present invention. As shown, base station 100 may include transceiver 109 coupled between processor 101 and antenna(s) 117 (e.g., an antenna array including multiple antennas), and memory 118 coupled to processor 101. Moreover, wireless terminal 200 may include transceiver 209 coupled between antenna(s) 217 (e.g., an antenna array including multiple antennas) and processor 201, and user interface 221 (e.g., including one or more of a display, a touch sensitive screen, a keypad, a microphone, a speaker, etc.) and memory 218 may be coupled to processor 201. Elements of FIG. 2 are shown by way of example, and illustrated elements may be omitted and/or other elements may be included. In an M2M or MTC type device, for example, user interface of wireless terminal 200 may be omitted. Accordingly, base station 100 may transmit communications through transceiver 109 and antenna array 117 for reception at wireless terminal 200 through antenna(s) 217 and transceiver 209, and wireless terminal 200 may transmit communications though transceiver 209 and antenna(s) 217 for reception at base station 100 through antenna(s) 117 and transceiver 109.

According to some embodiments discussed herein, radio access network 60 may provide different access control parameters for different groups of wireless terminals (UEs) by providing different barring rate modifiers and/or different access barring duration modifiers for the different groups of wireless terminals. Radio access network 60, for example, may provide a same barring rate and/or a same access barring duration for the different subsets (e.g., access classes) of wireless terminals (UEs), but radio access network 60 may provide the different barring rate modifiers and/or different access barring durations for the different subsets (e.g., access classes) of wireless terminals. Each wireless terminal may then allow/block network access using a modified barring rate (based on and/or responsive to the global barring rate and the respective barring rate modifier for the particular wireless terminal) and/or using a modified access barring duration (based on and/or responsive to the global access barring duration and the respective access barring duration modifier for the particular wireless terminal).

Processor 101 of base station 100 may thus be configured to provide a barring rate and an access barring duration for a plurality of wireless terminals 200. More particularly, the plurality of wireless terminals 200 may include a first subset of wireless terminals (e.g., wireless terminals 200a and 200b) and a second subset of wireless terminals (e.g., wireless terminals 200c and 200d) with the first and second subsets being mutually exclusive. Moreover, the barring rate and the access barring duration may be transmitted from processor 101 through transceiver 109 and antenna array 117 over wireless channel 300 to the plurality of wireless terminals 200.

Processor 101 of base station 100 may be further configured to provide a first barring rate modifier and a first access barring duration modifier for the first subset of wireless terminals (e.g., wireless terminals 200a and 200b), and to provide a second barring rate modifier (different than the first barring rate modifier) and a second access barring duration modifier (different than the first access barring duration modifier) for the second subset of wireless terminals (e.g., wireless terminals 200a and 200b). The first barring rate modifier and the first access barring duration modifier may be transmitted from processor 101 through transceiver 109 and antenna array 117 over wireless channel 300 to the first subset of wireless terminals 200a and 200b, and the second barring rate modifier and the second access barring duration modifier may be transmitted from processor 101 through transceiver 109 and antenna array 117 over wireless channel 300 to the second subset of wireless terminals 200c and 200d.

The different subsets of wireless terminals 200a-b and 200c-d provided with the same barring rate may thus provide different probabilities of access based on the different barring rate modifiers, and/or the different subsets of wireless terminals 200a-b and 200c-d provided with the same access barring duration may provide different barring durations based on the different access barring duration modifiers. Wireless terminal 200a of the first subset may thus receive the barring rate, the first barring rate modifier, the access barring duration, and the first access barring duration modifier, and wireless terminal 200c of the second subset may receive the barring rate, the second barring rate modifier, the access barring duration, and the second access barring duration modifier.

By way of example, processor 201 of wireless terminal 200a may receive the barring rate, the first barring rate modifier, the access barring duration, and the first access barring duration modifier from base station 100 over wireless channel 300 through antenna(s) 217 and transceiver 209. Processor 201 of wireless terminal 200a may be further configured to provide/calculate a first modified barring rate (different than the barring rate) responsive to the barring rate and the first barring rate modifier, and to provide/calculate a first modified access barring duration (different than the access barring duration) responsive to the access barring duration and the first access barring duration modifier.

Responsive to an attempt to access radio access network 60, processor 201 of wireless terminal 200a may provide/generate a random number. If the random number satisfies a threshold of the first modified barring rate (e.g., if the random number is lower than the first modified barring rate), processor 201 of wireless terminal 200a may allow access to radio access network 60. If the random number fails to satisfy a threshold of the first modified barring rate (e.g., if the random number is greater than the first modified barring rate), processor 201 of wireless terminal 200a may block access of the wireless terminal 200a to radio access network 60. Responsive to blocking access of the wireless terminal 200a to radio access network, processor 201 of wireless terminal 200a may continue blocking access of wireless terminal 200a to radio access network 60 for a period of time defined by the first modified access barring duration. Once the first access barring duration has passed, wireless terminal 200a may initiate another attempt to access radio access network 60.

Similarly, processor 201 of wireless terminal 200c may receive the barring rate, the second barring rate modifier, the access barring duration, and the second access barring duration modifier from base station 100 over wireless channel 300 through antenna(s) 217 and transceiver 209. Processor 201 of wireless terminal 200c may be further configured to provide/calculate a second modified barring rate (equal to or different than the barring rate and different than the first modified barring rate) responsive to the barring rate and the second barring rate modifier, and to provide/calculate a second modified access barring duration (different than the access barring duration and different than the first modified access barring duration) responsive to the access barring duration and the second access barring duration modifier.

Responsive to an attempt to access radio access network 60, processor 201 of wireless terminal 200c may provide/generate a random number. If the random number satisfies a threshold of the second modified barring rate (e.g., if the random number is lower than the second modified barring rate), processor 201 of wireless terminal 200c may allow access to radio access network 60. If the random number fails to satisfy a threshold of the second modified barring rate (e.g., if the random number is greater than the second modified barring rate), processor 201 of wireless terminal 200c may block access of the wireless terminal 200c to radio access network 60. Responsive to blocking access of the wireless terminal 200c to radio access network, processor 201 of wireless terminal 200c may continue blocking access of wireless terminal 200c to radio access network 60 for a period of time defined by the second modified access barring duration. Once the second access barring duration has passed, wireless terminal 200c may initiate another attempt to access radio access network 60.

Network access for different subsets of wireless terminals may thus be determined using the same barring rates and access barring durations but different barring rate modifiers and access barring duration modifiers. Moreover, barring rate modifiers and access barring duration modifiers for a same subset of wireless terminals may change over time as radio access network 60 transmits different barring rate modifiers and/or access barring duration modifiers. Network and wireless terminal operations will be discussed in greater detail below with respect to the flow charts of FIGS. 3 and 4.

Figure 3:
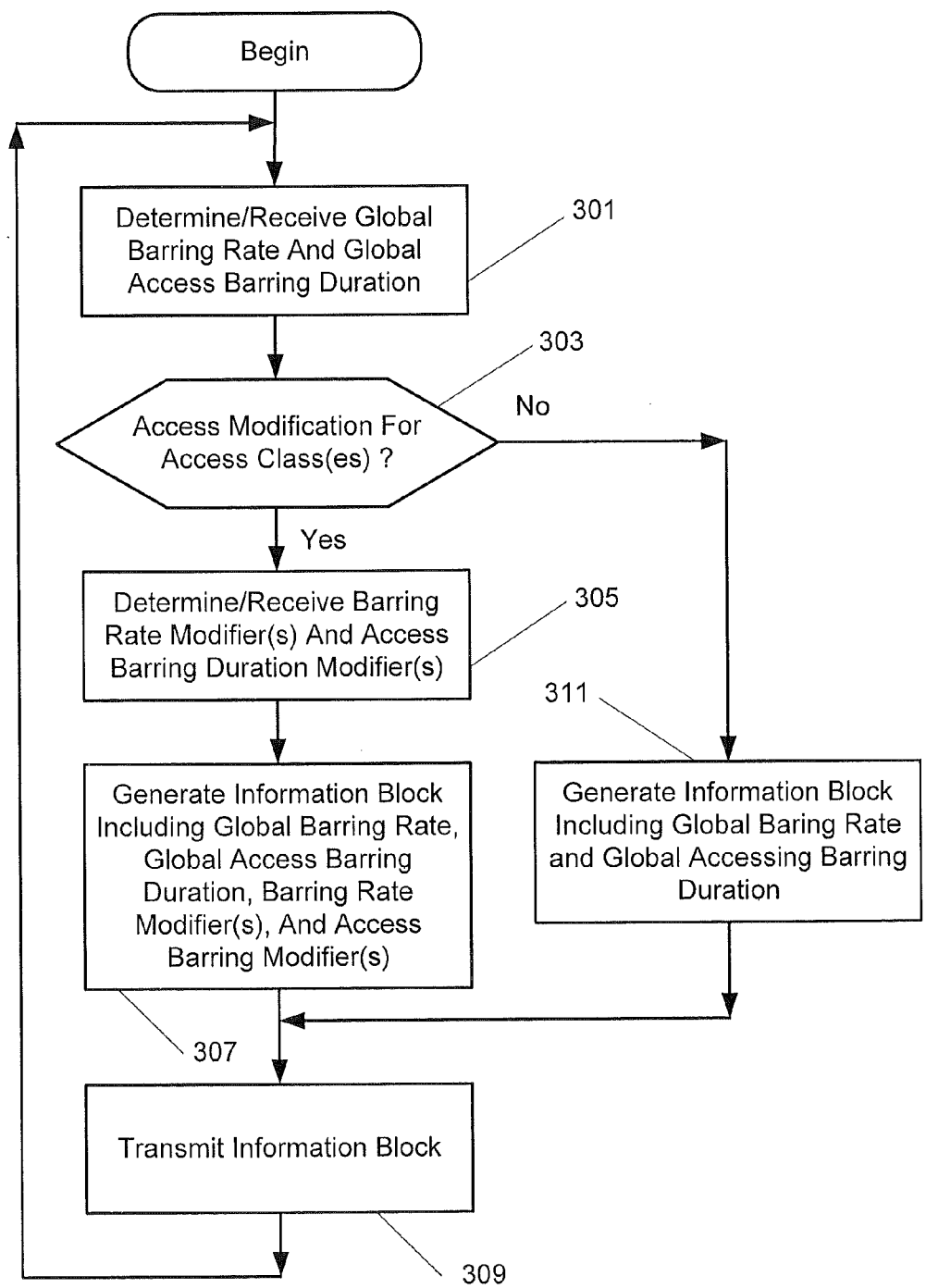
FIGS. 3 and 4 are flow charts respectively illustrating operations of network elements and wireless terminals of FIGS. 1 and/or 2.

FIG. 3 is a flow chart illustrating operations of a node of radio access network 60, such as base station 100, according to some embodiments of the present invention. At block 301, processor 101 of base station 100 may provide/determine a global barring rate and a global access barring duration for a plurality of wireless terminals 200 including first and second mutually exclusive subsets of wireless terminals 200a-b and 200c-d. The different subsets of wireless terminals 200a-b and 200c-d, for example, may be identified as different access classes as discussed above. While the global barring rate and the global access barring duration may change over time (e.g., at different iterations though block 301), the same global barring rate and global access barring duration may be provided for all subsets of the plurality of wireless terminals.

For example, processor 101 may determine the global barring rate and the global access barring duration based on a capacity/load of the base station 100. In an alternative, the global barring rate and the global access barring duration may be received from a higher level controller/processor in RAN 60 and/or in core network 70 (e.g., a Mobility-Management-Entity/Serving-Gateway or MME/S-GW) with the higher level controller/processor being coupled to multiple base stations and considering capacities/loads across elements of RAN 60 and/or core network 70 outside of an individual base station. Accordingly, the global barring rate and the global access barring duration may be based on a capacity/load of an individual base station, based on capacities/loads of multiple base stations, based on a capacity/load of radio access network 60, and/or based on capacities/loads of one or more core networks coupled to RAN 60. Alternatively, the global barring rate and the global access barring duration may be based on any algorithm estimating/predicting load in the RAN or core network, or predicting load in a combination of the RAN and core network.

The global barring rate, for example, may represent a probability greater than or equal to zero and lower than or equal to one, with a higher barring rate providing a higher probability that a wireless terminal may obtain network access and with a lower barring rate providing a lower probability that a wireless terminal may obtain network access. The global access barring duration may represent a time that must elapse before a wireless terminal may attempt to access radio access network 60 after a first access attempt has been barred. A higher global access barring duration may thus reduce a frequency of attempts to access RAN 60 that will be allowed for a wireless terminal.

If access modification for a subset or subsets (access class or classes) of wireless terminals is desired at block 303, processor 101 may provide/determine a barring rate modifier and an access barring duration modifier for at least one of the subsets (access classes) of wireless terminals at block 305. A barring rate modifier may represent a fraction greater than or equal to zero and lower than or equal to one, and an access barring duration modifier represents a multiple greater than or equal to one. A wireless terminal may calculate a modified barring rate as a product of its barring rate modifier and global barring rate to reduce a probability of access, and a wireless terminal may calculate a modified access barring duration as a product of its access barring duration modifier and global access barring duration to reduce a frequency of access attempts. A barring rate modifier of one does not modify the barring rate, and an access barring duration modifier of one does not modify the access barring duration.

By way of example, processor 101 may provide a first barring rate modifier (0<first_barring_rate_modifier<1) and a first access barring duration modifier (0<first_access_barring_duration_modifier<1) for the first subset of wireless terminals 200a-b, and a second barring rate modifier (0<second_barring_rate_modifier<1) and a second access barring duration modifier (0<second_access_barring_duration_modifier<1) for the second subset of wireless terminals 200c-d. At other times, processor 101 may provide a first barring rate modifier (0<first_barring_rate_modifier<1) and a first access barring duration modifier (0<first_access_barring_duration_modifier<1) for only the first subset of wireless terminals, with no barring rate modifier (or second_barring_rate_modifier=1) and no access barring duration modifier (or second_access_barring_duration_modifier=1) being provided for the second subset of wireless terminals.

Processor 101 may then generate an information block to be transmitted including the global barring rate, the global access barring duration, the first and second barring rate modifiers, and the first and second access barring modifiers at block 307. In 3GPP systems, the information block may be transmitted at the physical layer as a transport block, and this specific information/transport block containing access barring information may be termed a System Information Block or SIB. At block 309, the information block may be transmitted from processor 101 through transceiver 109 and antenna array 117 over wireless channel 300 to the plurality of wireless terminals (including subsets 200a-b and 200c-d). By providing the elements of the information block in appropriate fields and/or with appropriate identifiers, wireless terminals of the different subsets may be able to select the appropriate barring rate modifiers and/or access barring duration modifiers from the information block.

If access modification for subsets (access classes) is not needed at block 303, processor 101 may generate an information block including the global barring rate and the global access barring duration without providing barring rate modifiers or access barring duration modifiers at block 311. According to some embodiments, fields for barring rate modifiers and access barring duration modifiers may be omitted if access modification is not desired/needed. If fields for barring rate modifiers and/or access barring duration modifiers are omitted from the information block when modification is not desired/needed, the wireless terminal(s) may recognize the absence of modifiers in the information block and provide access without modifying the global barring rate and/or global access barring duration.

According to some other embodiments, fields for barring rate modifiers and access barring duration modifiers may be populated with a default value of one when modification is not desired/needed. By providing a default value of one for a barring rate modifier, a wireless terminal may multiply the default value of one with the barring rate without changing the barring rate. Similarly, by providing a default value of one for an access barring duration modifier, a wireless terminal may multiply the default value of one with the access barring duration without changing the access barring duration. At block 309, the information block may be transmitted/broadcast from processor 101 through transceiver 109 and antenna array 117 over wireless channel 300 to the plurality of wireless terminals (including subsets 200a-b and 200c-d).

Processor 101 may repeat operations of FIG. 3 indefinitely to provide dynamic access control for the different subsets (access classes) of wireless terminals in communication with RAN 60. More particularly, processor 101 may reconsider barring rate modifiers and/or access barring duration modifiers at each iteration though blocks 303 and 305. During a subsequent iteration through block 305, for example, processor 101 may maintain the second barring rate modifier and the second access barring duration modifier for the second subset of wireless terminals. Processor 101, however, may provide/determine a third barring rate modifier and a third access barring duration modifier for the first subset (access class) of wireless terminals 200a-b. Processor 101 may then generate a second information block including: the global barring rate; the global access barring duration; the third barring rate modifier and the third access barring duration modifier for the first subset of wireless terminals; and the second barring rate modifier and the second access barring duration modifier for the second subset of wireless terminals. The second information block may then be transmitted/broadcast from processor 101 through transceiver 109 and antenna array 117 over wireless channel 300 to the first and second subsets of wireless terminals 200a-b and 200c-d.

Accordingly, a same global barring rate and a same global access barring duration may be provided for a plurality of subsets (access classes) of wireless terminals while providing different barring rate modifiers and/or different access barring duration modifiers for different subsets (access classes) of the wireless terminals. Moreover, different barring rate modifiers and/or different access barring duration modifiers may be provided for a same subset of wireless terminals at different times while maintaining a same global barring rate and a same global access barring duration. RAN 60 may thus dynamically and separately control access for different subsets of wireless terminals communicating therewith.

Figure 4:
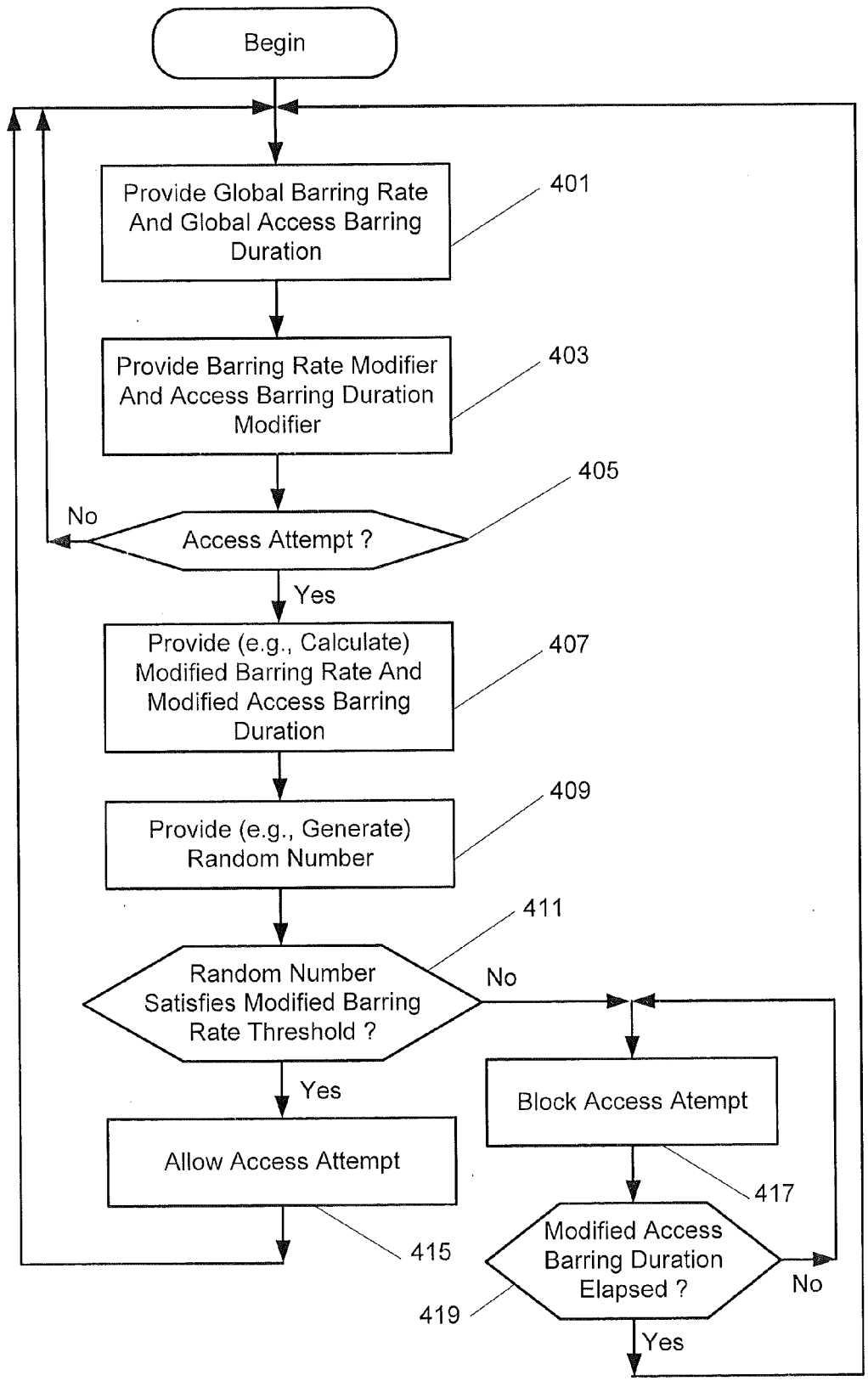

FIG. 4 is a flow chart illustrating operations of a wireless terminal 200 according to some embodiments of the present invention. As discussed above, a base station 100 may transmit information blocks (e.g., transport blocks, System Information Blocks or SIBs), with each information block including a global barring rate, a global access barring duration, one or more barring rate modifiers, and one or more access barring duration modifiers. Upon receipt of such an information block through antenna(s) 217 and transceiver 209, processor 201 of wireless terminal 200 may provide (e.g., read, retrieve, obtain, receive, etc.) the global barring rate and the global access barring duration at block 401 by identifying these elements of the information block. At block 403, processor 201 may provide (e.g., read, retrieve, obtain, receive, etc.) a barring rate modifier and an access barring duration modifier by identifying these elements of the information block. As discussed above, designated fields and/or identifiers of the information block may allow processor 201 to identify modifiers intended for the subset (asset class) of wireless terminals including the wireless terminal 200.

At block 405, processor 201 may cycle through blocks 401 and 403 until wireless terminal 200 attempts to access RAN 60 at block 405 (e.g., to initiate/accept a call, to initiate/accept a data session, etc.). When an attempt to access RAN 60 is initiated, processor 201 provides/calculates a modified barring rate responsive to the global barring rate and the barring rate modifier for the subset (access class) to which the wireless terminal belongs at block 407. At block 407, processor 201 may also provide/calculate a modified access barring duration responsive to the global access barring duration and the access barring duration modifier for the subset (access class) to which the wireless terminal belongs at block 407.

More particularly, the modified barring rate can be calculated as the product of the global barring rate and the barring rate modifier. If no modification of the barring rate is intended, a barring rate modifier of 1 may be provided (i.e., received from base station 100) so that the global barring rate remains unchanged after multiplication, or a barring rate modifier for the wireless terminal may be omitted from the information block so that processor 201 may use the global barring rate without multiplication. If modification of the barring rate is intended, a barring rate modifier lower than one may be provided in the received information block.

Similarly, the modified access barring duration can be calculated as the product of the global access barring duration and the access barring duration modifier. If no modification of the access barring duration is intended, an access barring duration modifier of 1 may be provided (e.g., received in an information block from base station 100) so that the global access barring duration remains unchanged after multiplication, or an access barring duration modifier for the wireless terminal may be omitted from the system information to be transmitted (in the information block) so that processor 201 may use the global barring rate without multiplication. If modification of the access barring duration is intended, an access barring duration modifier lower than one may be provided in the received information block.

Processor 201 may then provide/generate a random number at block 409, and the random number is compared with the modified barring rate at block 411. If the random number satisfies a threshold of the modified barring rate (e.g., the random number is lower than the modified barring rate) at block 411, the attempt to access RAN 60 may be allowed at block 415. If the random number fails to satisfy the threshold of the modified barring rate (e.g., the random number is greater than the modified barring rate) at block 411, the attempt to access RAN 60 may be blocked at block 417. If barring rate modification is not provided, processor 201 may compare the random number with the global barring rate at block 411.

At block 417 and 419, processor 201 may continue blocking access to radio access network 60 for a period of time defined by the modified access barring duration (or by the global access barring duration if modification is not needed/desired). By using an access barring duration modifier to increase a duration of barring after a blocked attempt to access radio access network 60, a frequency of access attempts by a subset of wireless terminals receiving the access barring duration modifier may be reduced.

Operations of FIG. 4 may be repeated any number of times to provide dynamic access control for the wireless terminal. Stated in other words, operations of blocks 401 and 403 may be repeated for each information block received from radio access network 60, and operations of blocks 407, 409, 411, 415, 417, and 419 may be repeated each time the wireless terminal attempts to access radio access network 60. Accordingly, different barring rates or modified barring rates and/or different access barring durations or modified access barring durations may be used during different attempts to access radio access network.

During a subsequent iteration through the flowchart of FIG. 4, for example, a base station 100 may transmit another information block including a the global barring rate, the global access barring duration, a second barring rate modifier for the wireless terminal, and a second access barring duration modifier for the wireless terminal. Upon receipt of such an information block through antenna(s) 217 and transceiver 209, processor 201 of wireless terminal 200 may maintain the same global barring rate and the same global access barring duration at block 401 by identifying these elements of the information block. At block 403, processor 201 may provide the second barring rate modifier (different than the previous barring rate modifier) and the second access barring duration modifier (different than the previous access barring duration modifier) by identifying these elements of the information block. Operations of blocks 407, 409, 411, 415, 417, and 419 may be the same as discussed above with the exception(s) that the modifiers are changed. Accordingly, different barring rates may be applied at blocks 407, 409, and 411 based on the different barring rate modifiers during different access attempts even though the global barring rate remains unchanged. Similarly, different access barring rate durations may be applied at blocks 407, 417, and 419 based on the different access barring duration modifiers during different access attempts even though the global access barring duration remains unchanged.

According to some embodiments of the present invention, a barring rate modifier and/or an access barring duration modifier may thus be addressed to a specific subset (access class) of wireless terminals so that the barring rate modifier and the access barring duration modifier are applied to the addressed subset of wireless terminals communicating with RAN 60 and not to other wireless terminals outside the subset communicating with RAN 60. RAN 60 may thus provide different access control characteristics for wireless terminals belonging to different subsets (access classes) in communication with RAN 60.

According to some other embodiments of the present invention, a barring rate modifier and/or an access barring duration modifier may be addressed for a specific class of services (e.g., voice service, data service, etc.). For example, a barring rate modifier and/or an access barring duration modifier may be addressed to a specific class of service for a specific subset (access class) of wireless terminals. Moreover, different barring rate modifiers and/or different access barring duration modifiers for different classes of service may be provided for the wireless terminals of a same subset (access class) so that different access control characteristics may be applied for different classes of service for the same wireless terminal. For example, different barring rate modifiers and/or different access barring duration modifiers may be provided for voice and data services provided from a same wireless terminal (belonging to a subset or access class to which the modifiers are addressed).

According to still other embodiments of the present invention, a barring rate modifier and/or an access barring duration modifier may be addressed to wireless terminals of a sub-network of radio access network 60. For example, the sub-network may be one of a plurality of Public Land Mobile Networks (PLMNs), or the sub-network may be a mobile virtual operator's network (MVNO) that is hosted by the wireless operator's network.

Embodiments of the present invention may thus provide/create at least one specialization of service or wireless terminal where access control parameters (e.g., barring rate and/or access barring duration) broadcast by radio access network 60 may be modified to alter overload protection and/or congestion control mechanism in RAN 60.

Several possible embodiments may modify EAB (Extended Access Barring) mechanisms to handle devices of different subsets (e.g., different service/access classes). One embodiment is to extend Service Specific Access Control (SSAC) for Multimedia Telephony (MMTEL) to different services, device classes, or subscription types. For example, two smart grid operators with devices of the type "energy meter" and a service type "meter reading" can use the meters differently for their respective smart grid operations (e.g., one has a larger amount of volatile energy sources and it selects a higher priority silver subscription type for its devices while the other selects a lower priority silver subscription).

By way of example, an access control (AC) barring rate modifier (also referred to as AC-BarringModifier(Service_or_Device_Class)) and an access control (AC) access barring duration modifier (also referred to as AC-BarringTimeMultiple(Service_or_Device_Class)) may be associated with each service class that warrants specialized congestion control. As discussed above, barring rate modifiers, access barring duration modifiers, global barring rate(s), and global access barring durations may be transmitted by RAN 60 in an information block(s), such as transport block(s), a System Information Block(s), or SIB(s). The wireless terminal (UE) that corresponds to that service or device class would modify the global broadcast parameters (e.g., global barring rate also referred to as AC-BarringFactor(SIB), and global access barring duration also referred to as AC BarringTime(SIB)) using the modifiers. A modified barring rate (also referred to as AC-BarringFactor) may be calculated as a product of the barring rate modifier and the global barring rate (i.e., AC-BarringFactor=AC-BarringFactor(SIB)*AC-BarringModifier(Service_or_Device_Class)). A modified access barring duration may be calculated as a product of the access barring duration modifier and the global access barring duration (i.e., AC-BarringTime=AC-BarringTime(SIB)*AC-BarringTimeMultiple(Service_or_Device_Class)).

As an example when EAB is active, global (default) values for barring rate (AC-BarringFactor(SIB)) and access barring duration (AC-BarringTime(SIB)) are 0.5 (50%) and 4 seconds respectively. If barring rate modifier (AC-BarringModifier(Service_or_Device_Class)) is ¹⁄₁₀ (0.1) and access barring duration modifier (AC-BarringTimeMultiple(Service_or_Device_Class)) is 2, the modified barring rate (AC-BarringFactor) will be reduced to 5% (0.05) and the modified access barring duration (AC-BarringTime) will be increased to 8 seconds. Accordingly, wireless terminals belonging to this special service class (e.g., a class of relatively low priority sensors) will successfully complete only 5% of all attempts to access RAN 60, and after a failed attempt to access RAN 60, a wireless terminal will be blocked from a subsequent attempt for at least 8 seconds.

In some embodiments, default EAB parameters for AC-BarringFactor and AC-BarringTime will be interpreted to be 100% (1) both in terms of probability of successfully completing an attempt to access RAN and time in seconds respectively if the Access Control Barring for Mobile Originating Signaling (AC-BarringForMO-Signaling) of Access Control Barring for Mobile Originating Data (AC-BarringForMO-Data) is activated. See, 3GPP TS 36.331, V10.3.0, September 2011. A reason for this is so that there may be no need to bar wireless/mobile terminals that do not belong to a particular special service class when that particular special service class is subjected to access restriction.

In legacy networks, EAB may be handled as in Release 10 of the E-UTRA (Evolved Universal Terrestrial Radio Access Network) specification.

Additional embodiments may define a number of service classes, with each service class being provided with a respective AC-BarringModifier and AC-BarringTimeMultiple.

Still further embodiments may extend concepts of the present invention to a Mobile Virtual Network Operator (MVNO) where the barring rate modifier and/or access barring duration modifier are used to alter top level parameters that are broadcast by a hosting PLMN. Accordingly, different barring rate and/or access barring duration modifiers may be used for different virtual operators.

According to some additional embodiments, the AC-BarringModifier and the AC-BarringTimeMultiple may be varied geographically where the loading from particular classes of service and/or classes of devices is used to determine a congestion control strategy or overload protection for a cell (or base station), location area, and/or routing area. For a same class of service/device (e.g., electric meters), RAN 60 and/or core network 70 may provide different AC-BarringModifiers and/or AC-BarringTimeMultiples for rural cells (with relatively few electric meters) and urban/suburban cells (with relatively many electric meters).

According to some other embodiments, the AC-BarringModifier and the AC-BarringTimeMultiple for a class of services/devices may be varied over the course of a day so that certain services/devices can have a higher or lower access priority at certain times of the day. For example, certain M2M or MTC devices such as sensors may be configured to successfully report measurements more frequently at certain times of the day. More particularly, traffic sensors may be provided with a higher AC-BarringModifier and a lower AC-BarringTimeMultiple during periods of high traffic (e.g., during rush hour).

Some additional embodiments may vary the AC-BarringModifier and the AC-BarringTimeMultiple for a class of services/devices depending on the load in the radio cell (base station) and/or neighboring radio cells (base stations). The radio cell load can thereby be in utilization of radio transmission capacity, backhaul network utilization radio node processing load, or radio node memory usage. For example, low access barring probabilities (i.e., high AC-BarringModifier) and low access barring times (durations) may be provided at low radio cell loads to allow reduced access delays, and high access barring probabilities (i.e., low barring rates) and high access barring times (AC-BarringTimeMultiple) may be provided at high radio cell loads (e.g., when the load exceeds some load threshold) to reduce the cell load.

According to still further embodiments, different AC-BarringModifiers and AC-BarringTimeMultiples may be provided for wireless terminals operating in RAN 60 as their home PLMN as opposed to roaming wireless terminals operating in RAN 60 (i.e., that have a different home PLMN). Stated in other words, wireless terminals operating in RAN 60 as their home network may be treated preferentially (e.g., higher AC-BarringModifier and lower AC-BarringTimeMultiples) relative to wireless terminals that are roaming in RAN 60. Moreover, among roaming wireless terminals, AC-BarringModifiers and AC-BarringTimeMultiples may be set differently depending on the home PLMN of the wireless terminal being in a list of preferred PLMNs of RAN 60, or not.

In further embodiments of the present invention, AC-BarringModifiers and AC-BarringTimeMultiples may be set differently for wireless terminals subscribing to different service operators/providers operating different core networks but sharing RAN 60 or elements thereof. For example, AC-BarringModifiers and AC-BarringTimeMultiples may be set according to a load(s) in core network 70 (which may be processing load in core network nodes, memory usage in core network nodes, or transport network utilization). When RAN 60 is shared by multiple operators/providers using respective different core networks connected to radio access network 60, AC-BarringModifiers and AC-BarringTimeMultiples may be set differently for wireless terminals connecting into different core networks depending on the core network load of the respective core networks.

Moreover, embodiments discussed above may be applied in UTRAN and/or E-UTRAN wireless communications systems. In addition, values of AC-BarringModifiers and AC-BarringTimeMultiples based on different classes of services/devices, types of users in terms of PLMN location, and/or operators in terms of a shared RAN may be broadcast from a base station within a cell as elements of an information block(s), such as a transport block(s), a standardized System Information Block(s), or SIB(s)).

According to still other embodiments, values of AC-BarringModifiers and AC-BarringTimeMultiples based on different classes of services/devices, types of users in terms of PLMN location, and/or operators in terms of a shared RAN, may be hard coded in device memory.

According to yet further embodiments, the values of AC-BarringModifiers and AC-BarringTimeMultiples based on different classes of services/devices, types of users in terms of PLMN location, and/or operators in terms of a shared RAN, may be configured in the wireless terminal when the wireless terminal is wirelessly connected to a network using a device management procedure (such as OMA or Open Mobile Alliance device management) controlled by a device management server located in the network.

According to still further embodiments, wireless terminals that are not configured for EAB may have different AC-BarringModifiers and AC-BarringTimeMultiples than wireless terminals discussed above that are configured for EAB.

Some embodiments of the present invention may thus provide congestion control and/or overload protection mechanisms for mobile wireless networks, and these mechanisms may be particularly useful in networks servicing MTC devices and/or wireless terminals that are grouped into different service/device classes.

Some embodiments of the present invention may allow the entire Access Control Classification space to be used for any MTC device, and/or may provide flexibility to an operator to separate the access probabilities of different devices depending on the type of higher layer service the device supports.

In embodiments where access control is varied depending on the status of a wireless terminal as being home or roaming, the network operator may have flexibility to provide preferential access (e.g., higher access probability) to its own users/subscribers (i.e., wireless terminals operating in RAN 60 as their home PLMN) relative to roaming wireless terminals that are subscribers to other operator networks. Moreover, differentiation may be provided between different roaming wireless terminals communicating with RAN 60. For example, preferential access control may be provided for roaming wireless terminals from other network operators that have reciprocal agreements with an operator of RAN 60 relative to roaming wireless terminals from other network operators that do not have reciprocal agreements with the operator of RAN 60.

In embodiments where different AC-BarringModifiers and/or AC-BarringTimeMultiples are used for wireless terminals subscribing to different service operators/providers operating different core networks but sharing RAN 60 (or elements thereof), there may be flexibility for an operator/owner of RAN 60. For example, an operator/owner of RAN 60 and a relatively high capacity core network 70 can assign AC-BarringModifiers and/or AC-BarringTimeMultiples to provide relatively higher probabilities of access to its subscriber/customer wireless terminals relative to other wireless terminals that are subscribers/customers of other operators/owners using other relatively lower capacity core networks but sharing RAN 60.

Figure 5:
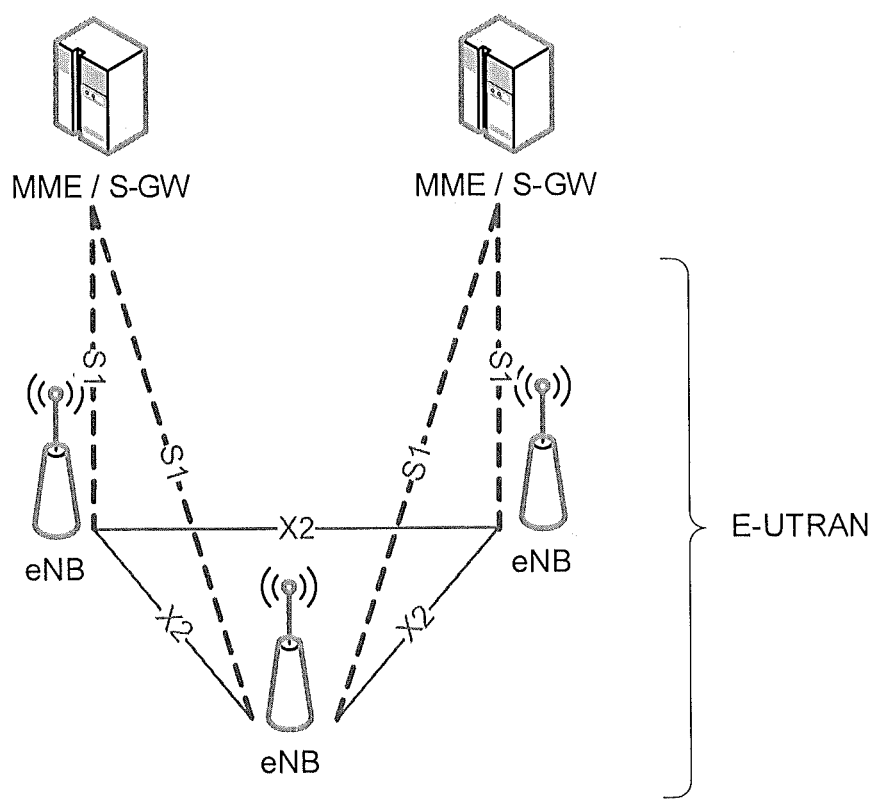
FIG. 5 is a schematic diagram of network elements according to some embodiments of the present invention.

FIG. 5 is a diagram illustrating an arrangement/architecture of RAN and core network elements according to some E-UTRAN (in accordance with 3GPP TS 36.300) compatible embodiments of the present invention. As shown, one or more MME/S-GW (Mobility-Management-Entity/Serving-Gateway) nodes may be provided as elements of the same or different core networks 70, and eNB (eNodeB) base station nodes may be provided as elements of RAN 60 as shown in FIG. 1. The one or more MME/S-GW nodes of core network 70 may thus control assignments of AC-BarringFactors, AC-BarringTimes, AC-BarringModifiers, and/or AC-BarringTimeMultiples for wireless terminals communicating through eNB base station nodes of RAN 60. In the event that load conditions in E-UTRAN and/or within the core network allow, the one or more eNBs of RAN 60 may control assignments of AC-BarringFactors, AC-BarringTimes, AC-BarringModifiers, and/or AC-BarringTimeMultiples for wireless terminals communicating with the respective one or more eNBs of RAN 60.

Figure 6:
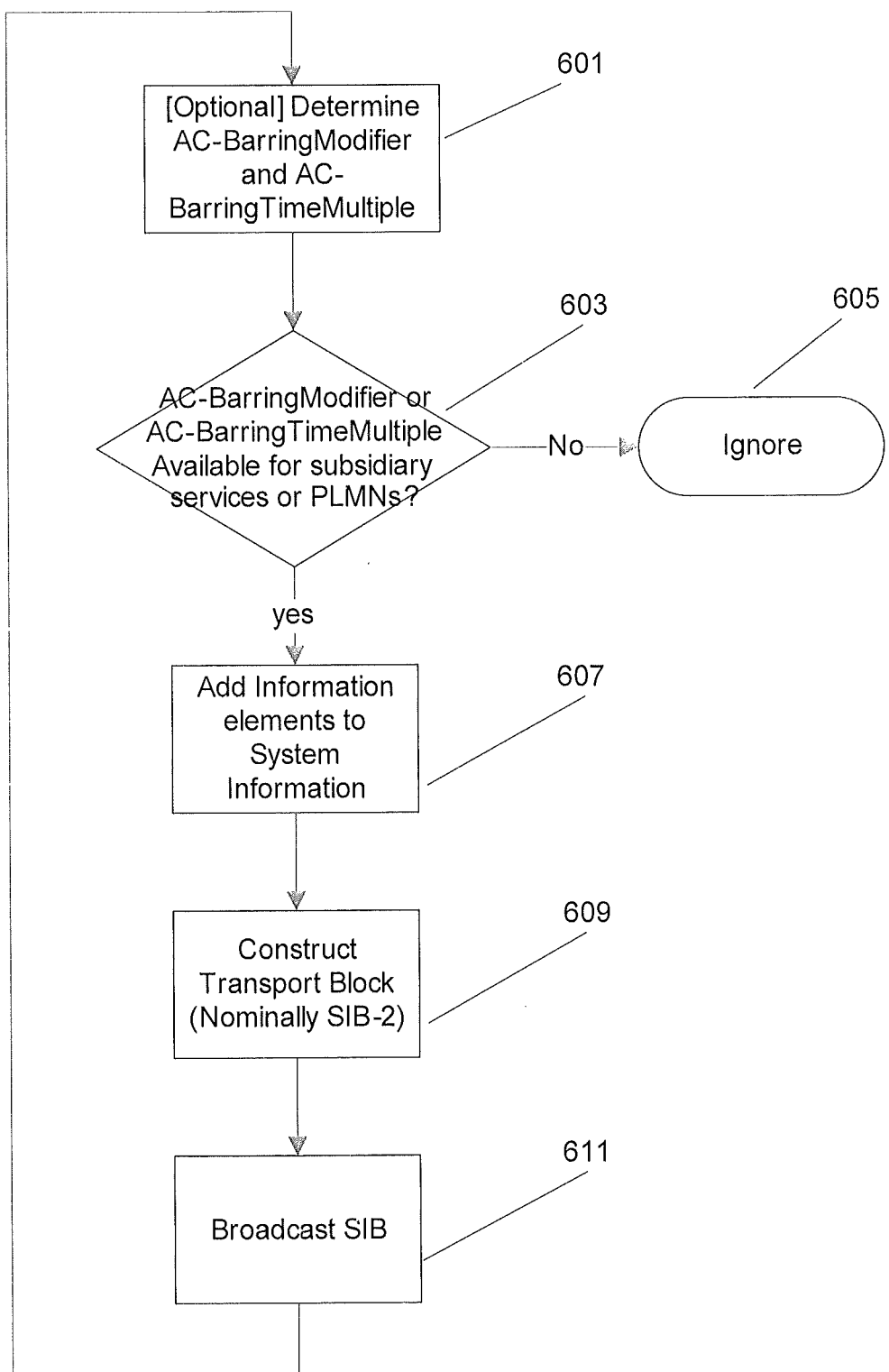
FIGS. 6 and 7 are flow charts respectively illustrating operations of network elements and wireless terminals according to some embodiments of the present invention.

FIG. 6 illustrates network (e.g., base station) operations involved when methods of some embodiments of the present invention are executed in an E-UTRAN compatible RAN. For example, an E-UTRAN System Information Block 2 (SIB-2) may be used as an information/transport block to broadcast access barring parameters (e.g., AC-BarringFactors, AC-BarringTimes, AC-BarringModifiers, and/or AC-BarringTimeMultiples). At block 601, an eNB and/or MME/S-GW may optionally determine AC-BarringModifiers and/or AC-BarringTimeMultiples for one or more subsets (access classes) of wireless terminals communicating with RAN 60. At block 603, the eNB and/or MME/S-GW may determine if an AC-BarringModifier and/or AC-BarringTimeMultiple is available for subsidiary services or PLMNs. If not, access control modification may be ignored at block 605. If available, eNB and/or MME/S-GW may provide access barring information elements (e.g., AC-BarringFactor, AC-BarringTime, AC-BarringModifier(s), and/or AC-BarringTimeMultiple(s)) as System Information at block 607. At Block 609, the eNB and/or MME/S-GW may construct an information/transport block (e.g., an SIB-2 transport block) including the system information, and more particularly, including the access barring information elements (e.g., AC-BarringFactor, AC-BarringTime, AC-BarringModifier(s), and/or AC-BarringTimeMultiple(s)). At block 611, the eNB may broadcast the information/transport block (e.g., SIB-2) to the wireless terminals communicating therewith. While discussed with respect to E-UTRAN, embodiments of the present invention may be implemented using UTRAN with access barring parameters being transmitted/broadcast using SIB-3.

Figure 7:
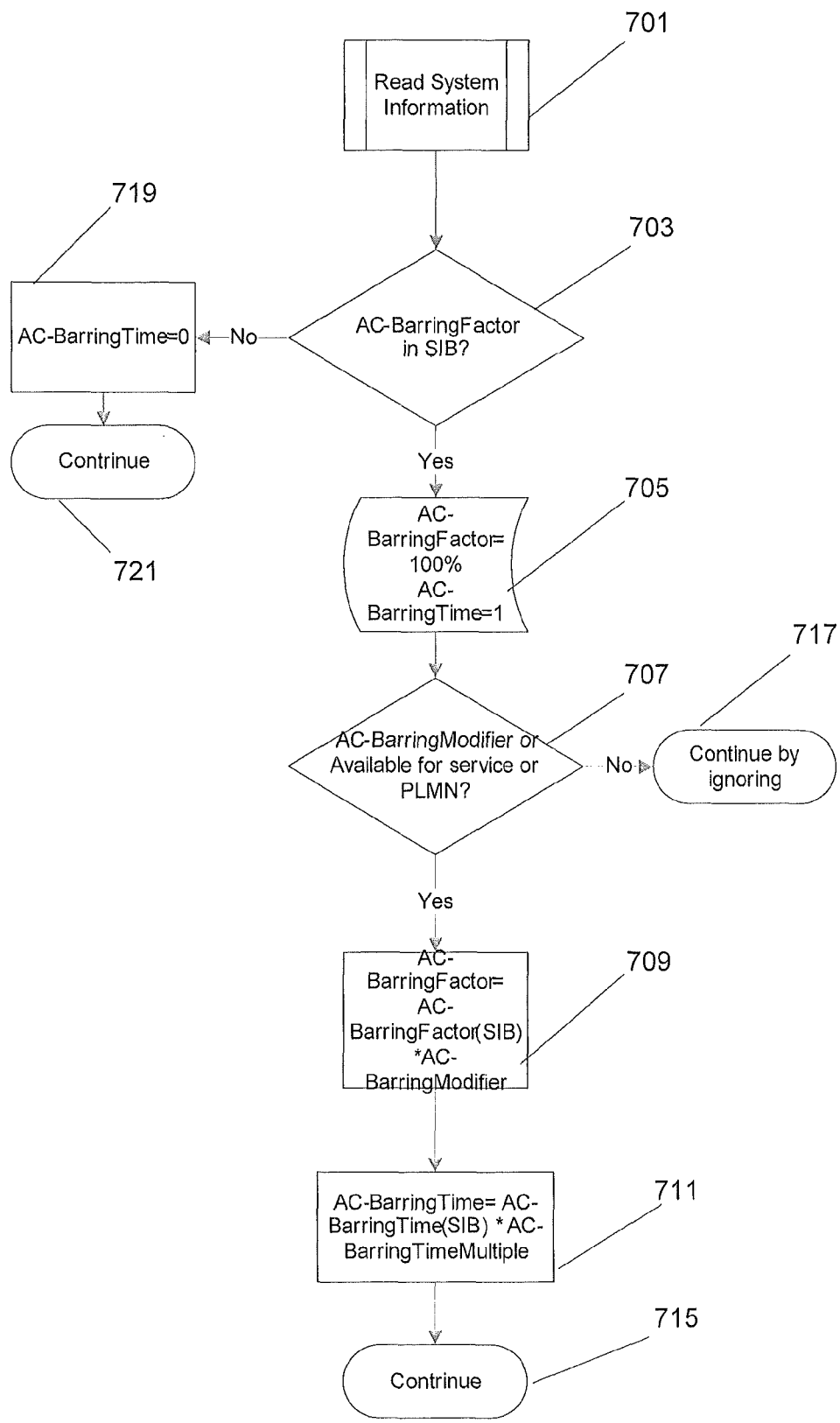

FIG. 7 illustrates wireless terminal (UE) operations relating to access control according to some embodiments after receiving barring information where the wireless terminal (UE) may belong to a PLMN that defines an MTC device access class. Upon receiving an information/transport block (e.g., a SIB) including access barring parameters (e.g., an AC-BarringFactor, an AC-BarringTime, an AC-BarringModifier, and/or an AC-BarringTimeMultiple) from RAN 60, processor 201 of wireless terminal (UE) may read system information from the information/transport block at block 701. If there is no AC-BarringFactor in the information/transport block (e.g., system information block or SIB) at block 703, the wireless terminal may operate without blocking access attempts (e.g., AC-BarringTime=0) at blocks 719 and 721. Stated in other words, the wireless terminal may be allowed to complete all access attempts without generating a random number or comparing such a random number to a barring rate or barring factor (modified or otherwise).

If an AC-BarringFactor is included in the information/transport block (e.g., system information block or SIB) at block 703, the wireless terminal may set the AC-BarringFactor equal to 100% or 1 (AC-BarringFactor=100%), and the wireless terminal may set the AC-BarringTime to 1 (AC-BarringTime=1), at block 705. If there is no AC-BarringModifier, the wireless terminal is not available for service, or the wireless terminal does not belong to an outside PLMN at block 707, wireless terminal can continue by ignoring access control BarringFactors and/or BarringTimes at block 717. If there is an AC-BarringModifier, the wireless terminal is available for service, or the wireless terminal belongs to an outside PLMN at block 707, the wireless terminal may calculate a modified AC-BarringFactor as a product of the global AC-BarringFactor (AC-BarringFactor(SIB)) and the AC-BarringModifier received in the information/transport block at block 709. At block 711, the wireless terminal may calculate a modified AC-BarringTime as a product of the global AC-BarringTime(SIB) and the AC-BarringMultiple received in the information/transport block. At block 715, the wireless terminal may continue with operations using the modified AC-BarringFactor and the modified AC-BarringTime from blocks 709 and 722 for subsequent access attempts.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein. While VoIP data packet communications are discussed by way of example, embodiments may be implemented for other real time data packet communications such as audio and/or video streaming.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments, which fall within the spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method in a wireless terminal of modifying access to a Radio Access Network, the method comprising:
   receiving a global barring rate at the wireless terminal from the Radio Access Network;
   receiving a barring rate modifier at the wireless terminal from the Radio Access Network;
   providing a modified barring rate at the wireless terminal responsive to the global barring rate and the barring rate modifier, wherein the modified barring rate and the global barring rate are different, and wherein the modified barring rate comprises a product of the global barring rate and the barring rate modifier;
   providing a random number at the wireless terminal responsive to attempting to access the Radio Access Network; and
   responsive to the random number failing to satisfy a threshold of the modified barring rate, blocking access of the wireless terminal to the Radio Access Network.

2. The method according to claim 1 further comprising:
   responsive to the random number satisfying the threshold of the modified barring rate, allowing access to the Radio Access Network.

3. The method according to claim 1 wherein the global barring rate represents a probability between and including zero and one, and wherein the barring rate modifier represents a fraction between zero and one.

4. The method according to claim 3 wherein blocking access comprises blocking access to the Radio Access Network responsive to the random number being greater than the modified barring rate.

5. The method according to claim 1 wherein the barring rate modifier comprises a first barring rate modifier, wherein the modified barring rate comprises a first modified barring rate, wherein the random number comprise a first random number, and wherein blocking access comprises blocking a first access of the wireless terminal, the method further comprising:
   after blocking the first access to the Radio Access Network, receiving a second barring rate modifier at the wireless terminal from the Radio Access Network wherein the first and second barring rate modifiers are different;
   providing a second modified barring rate at the wireless terminal responsive to the global barring rate and the second barring rate modifier, wherein the second modified barring rate and the global barring rate are different and wherein the first and second modified barring rates are different;
   providing a second random number at the wireless terminal responsive to attempting a second access of the wireless terminal to the Radio Access Network;
   responsive to the second random number failing to satisfy a threshold of the second modified barring rate, blocking the second access of the wireless terminal to the Radio Access Network; and
   responsive to the second random number satisfying the threshold of the second modified barring rate, allowing the second access of the wireless terminal to the Radio Access Network.

6. The method according to claim 1 further comprising:
   receiving a global access barring duration at the wireless terminal from the Radio Access Network;
   receiving an access barring duration modifier at the wireless terminal from the Radio Access Network; and
   providing a modified access barring duration at the wireless terminal responsive to the global access barring duration and the access barring duration modifier, wherein the modified access barring duration and the global access barring duration are different;
   wherein blocking access of the wireless terminal to the Radio Access Network comprises blocking access of the wireless terminal to the Radio Access Network for a period of time defined by the modified access barring duration.

7. The method according to claim 6, wherein the global access barring duration represents a time, wherein the access barring duration modifier represents a multiple greater than one, and wherein the modified access barring duration comprises a product of the global access barring duration and the access barring duration modifier.

8. A wireless terminal configured to communicate with a Radio Access Network, the wireless terminal comprising:
   a processor configured to receive a global barring rate and a barring rate modifier from the Radio Access Network, to provide a modified barring rate responsive to the global barring rate and the barring rate modifier with the modified barring rate and the global barring rate being different, to provide a random number responsive to attempting to access the Radio Access Network, and to block access to the Radio Access Network responsive to the random number failing to satisfy a threshold of the modified barring rate, wherein the modified barring rate comprises a product of the global barring rate and the barring rate modifier.

9. The wireless terminal according to claim 8 wherein the barring rate modifier comprises a first barring rate modifier, wherein the modified barring rate comprises a first modified barring rate, wherein the random number comprise a first random number, and wherein blocking access comprises blocking a first access, wherein the processor is further configured to receive a second barring rate modifier from the Radio Access Network after blocking the first access to the Radio Access Network with the first and second barring rate modifiers being different, to provide a second modified barring rate responsive to the global barring rate and the second barring rate modifier with the second modified barring rate and the global barring rate being different and with the first and second modified barring rates being different, to provide a second random number responsive to attempting a second access of to the Radio Access Network, to block the second access to the Radio Access Network responsive to the second random number failing to satisfy a threshold of the second modified barring rate, and to allow the second access to the Radio Access Network responsive to the second random number satisfying the threshold of the second modified barring rate.

10. The wireless terminal according to claim 8 wherein the processor is further configured to receive a global access barring duration and an access barring duration modifier from the Radio Access Network, to provide a modified access barring duration responsive to the global access barring duration and the access barring duration modifier with the modified access barring duration and the global access barring duration being different, and to block access to the Radio Access Network for a period of time defined by the modified access barring duration.

11. The wireless terminal according to claim 8 wherein the global barring rate represents a probability between and including zero and one, and wherein the barring rate modifier represents a fraction between zero and one.

12. A method in a node of a Radio Access Network of modifying wireless terminal access, the method comprising:
 providing a global barring rate for a plurality of wireless terminals, wherein the plurality of wireless terminals includes first and second mutually exclusive subsets of wireless terminals;
 providing a barring rate modifier for the first subset of wireless terminals; and
 transmitting the global barring rate for the plurality of wireless terminals and the barring rate modifier for the first subset of wireless terminals, wherein a product of the global barring rate and the barring rate modifier defines a modified barring rate for the first subset of wireless terminals that is different than the global barring rate such that the modified barring rate defines a threshold used by the first subset of wireless terminals to allow or block access to the Radio Access Network.

13. The method according to claim 12 wherein the barring rate modifier comprises a first subset barring rate modifier, the method further comprising:
 providing a second subset barring rate modifier for the second subset of wireless terminals, wherein the first subset barring rate modifier and second subset barring rate modifier are different;
 wherein transmitting further comprises transmitting the second subset barring rate modifier for the second subset of wireless terminals.

14. The method according to claim 12 wherein the barring rate modifier comprises a first barring rate modifier, the method further comprising:
 after transmitting the first barring rate modifier, providing a second barring rate modifier for the first subset of wireless terminals, wherein the first and second barring rate modifiers are different; and
 after providing the second barring rate modifier, transmitting the second barring rate modifier for the first subset of wireless terminals.

15. The method according to claim 12 wherein the global barring rate represents a probability between and including zero and one, and wherein the barring rate modifier represents a fraction between zero and one.

16. The method according to claim 12 further comprising:
 providing a global access barring duration for the plurality of wireless terminals; and
 providing an access barring duration modifier for the first subset of wireless terminals;
 wherein transmitting comprises transmitting the global access barring duration for the plurality of wireless terminals and the access barring duration modifier for the first subset of wireless terminals.

17. The method according to claim 16, wherein the global access barring duration represents a time, and wherein the access barring duration modifier represents a multiple greater than one.

18. A node of a Radio Access Network comprising:
 a processor configured to provide a global barring rate for a plurality of wireless terminals, wherein the plurality of wireless terminals includes first and second mutually exclusive subsets of wireless terminals, to provide a barring rate modifier for the first subset of wireless terminals, and to initiate transmitting the global barring rate for the plurality of wireless terminals and the barring rate modifier for the first subset of wireless terminals, wherein a product of the global barring rate and the barring rate modifier defines a modified barring rate for the first subset of wireless terminals that is different than the global barring rate such that the modified barring rate defines a threshold used by the first subset of wireless terminals to allow or block access to the Radio Access Network.

19. The node of the Radio Access Network according to claim 18 wherein the barring rate modifier comprises a first subset barring rate modifier, the processor being further configured to provide a second subset barring rate modifier for the second subset of wireless terminals, wherein the first subset barring rate modifier and second subset barring rate modifier are different, and to initiate transmitting the second subset barring rate modifier for the second subset of wireless terminals.

20. The node of the Radio Access Network according to claim 18 wherein the barring rate modifier comprises a first barring rate modifier, the processor being further configured to provide a second barring rate modifier for the first subset of wireless terminals after transmitting the first barring rate modifier, wherein the first and second barring rate modifiers are different, and to initiate transmitting the second barring rate modifier for the first subset of wireless terminals after providing the second barring rate modifier.

* * * * *